United States Patent [19]

Wojtecki et al.

[11] 4,347,433
[45] Aug. 31, 1982

[54] HEAT TRANSFER APPARATUS FOR RELEASABLY SECURING HEATING OR COOLING MEANS TO PIPE

[75] Inventors: Rudolph G. Wojtecki, Mantua; Joseph P. Kaan, Stow, both of Ohio

[73] Assignee: Eaton Corporation, Cleveland, Ohio

[21] Appl. No.: 50,922

[22] Filed: Jun. 21, 1979

[51] Int. Cl.³ .............................................. H05B 3/40
[52] U.S. Cl. .................................. 219/535; 219/301; 165/183
[58] Field of Search ............... 219/301, 535, 530, 540; 174/117 A, 91; 165/180, 183–185

[56] References Cited

U.S. PATENT DOCUMENTS

| | | | |
|---|---|---|---|
| 2,687,626 | 8/1954 | Bartlowe | 219/301 |
| 3,029,303 | 4/1962 | Severino | 174/97 |
| 3,074,677 | 1/1963 | Eckhardt | 174/117 A |
| 3,343,596 | 9/1967 | Kritzer | 219/301 |
| 3,398,262 | 8/1968 | Kahn | 219/301 |

FOREIGN PATENT DOCUMENTS

| | | | |
|---|---|---|---|
| 1266991 | 6/1961 | France | 174/97 |
| 1512610 | 1/1968 | France | 174/97 |

*Primary Examiner*—Bernard Roskoski
*Attorney, Agent, or Firm*—C. H. Grace; A. Chrow

[57] ABSTRACT

A heat transfer apparatus (13) adapted to releasably secure an elongate heating or cooling means to a pipe. Apparatus (13) has a flexible base member (3) that adapts to the radius of curvature of the outer circumference of the pipe and preferably has at least one protuberance (8) in its wall. One or two resilient side walls (4) extend over the side of base member (3) that faces away from the pipe to provide a longitudinal cavity for containing the heating or cooling means. An entrance-way (6) is provided for inserting or removing the heating source into or from the cavity. Side walls (4) are shaped such that they press uniformly against the heating or cooling means and urge said means against base member (3). Means (11) are provided for securing apparatus (13) to the pipe so the heating or cooling means can be removed from or inserted into the cavity without having to release apparatus (13) from the pipe.

4 Claims, 12 Drawing Figures

HEAT TRANSFER APPARATUS FOR RELEASABLY SECURING HEATING OR COOLING MEANS TO PIPE

INTRODUCTION

This invention relates generally to a pipe heating or cooling arrangement and more particularly to apparatus that is designed to releasably secure an elongate heating or cooling means to the outer surface of the pipe.

BACKGROUND OF THE INVENTION

Pipe used in chemical refining plants is often heated or cooled as a means of maintaining viscosity or preventing precipitation of materials conveyed. Means in the form of electrical resistance heating wires and cables for heating pipe, and tubes having heated or cooled mediums conveyed therethrough are commonly employed as a means of heating or cooling materials conveyed through the pipe.

It has heretofore been the practice to secure such heating or cooling means to the outer surface of pipe by a variety of methods. For example, heating of cooling means have been secured directly to the outer surface of the pipe by straps, clamps, heat conducting cement and the like. Such practices, however, do not generally provide a uniform means of pressing the heating or cooling means against the pipe and require the removal of the straps, clamps, and the like, from the pipe in order to repair or replace the heating or cooling means. A problem can arise in the case where it becomes difficult to remove a heating or cooling means that has been bonded to the outer surface of the pipe.

A variety of devices are disclosed in the prior art for securing heating or cooling means to the wall of a member to be heated or cooled. U.S. Pat. No. 2,612,351, for example, discloses a device for mounting evaporation tubing on the wall of a refrigeration unit. The device comprises a C shaped channel secured to the wall of a unit. The channel has a strip of deformable heat conductive material disposed along its base against which the evaporator conduit is pressed. The conduit is held against the base by means of a cover plate that is shaped to the general contour of the conduit and has extensions which slidingly engage with flanges provided on the channel. Such a device, however, does not provide for resilient walls on the channel and requires a cover plate specially contoured for each type of conduit contained in the channel. The device would also be overly expensive for use on long lengths of pipe and would be difficult to utilize in that the cover plate is designed to slidingly engage with the channel which may not lend itself to practical use in many applications because of the particular piping configurations involved.

Another example of a heat apparatus is disclosed in U.S. Pat. No. 3,448,798 in which a U shaped groove is extruded in the wall of a member of containing a tube for use in heating or cooling the member. The groove has legs which can be bent over to contain the tube in the groove. Such apparatus does not however lend itself practically or economically to the problem of heating or cooling pipe already installed. Further, the cost and handling problems of pipe having such grooves extruded in their wall would be prohibitive in many piping installations. The ability to unbend and bend the groove legs repeatedly in order to replace or repair the tubes may also present a problem.

U.S. Pat. No. 3,398,262 discloses an electrical heater strip secured to a pipe by means of annular straps. Although such arrangements are sometimes used for the heating of pipe, the arrangement does not provide for pressing the heating strip in a uniform manner against the pipe and would require removing the annular straps in order to repair of replace the heater strip.

Another example of mounting tubes against the outer surface of pipe is disclosed in U.S. Pat. No. 3,844,345. Disclosed are a pair of control tubes contained in a crescent shaped encapsulation having a concave inner surface for mounting against the convex outer surface of production oil and gas tubing. The encapsulated control tubes are held against the pipe by means of straps. Although such an arrangement may be used to advantage for control purposes in well applications, it would be costly and impractical to replace or repair the control tubes because of their encasement in an elastomeric encapsulation and would further require the removal of the straps from the pipe in order to do so.

Another example of mounting electrical heating wires and conduit on pipe is disclosed in U.S. Pat. No. 3,971,416. Disclosed are both electrical conductors and cylindrical conduit (containing electrical wires) secured to a pipe. The electrical wire is covered by a heater housing and the conduit is bonded to the pipe by means of a heat transfer material. The heater housing may be welded to the pipe or, as the conduit, may be bonded to the pipe. Both are surrounded by an insulation layer having a protective outer cover. As hereinbefore described, both means disclosed would require removal of the bands or breaking of the welding in order to pull the wires from the end of a given section in order to replace or repair them. Further, the bands would not press the wires against the pipe in a uniform manner and the bonding may give rise to problems in the event it becomes difficult to remove the bonding material from the pipe.

An example of a C shaped clip having resilient outer portions for clinching a heat exchange conduit with a solar heat absorber is disclosed in U.S. Pat. No. 4,120,283. The clip has a central portion between the outer portion with an arch therein for supporting the conduit. The outer portions are designed to embrace and distort the heat absorber while holding the conduit and the central portion away from the heat absorber. The clip is designed so that it is necessary to remove the clip from the heat absorber in order to insert the conduit into or remove it from the clip.

Another example of the use of formable heat conductive material as a means of securing electrical heating wire or a tube to the outer surface of a pipe is disclosed in U.S. Pat. No. Re. 29,332. Disclosed are a pair of electrical wires or a tube encased in a preshaped molding or extrusion of a heat transfer material. As in the case of U.S. Pat. No. 3,894,345 described above, the molding or extrusion has a concave surface along one side for conforming with the convex surface of the pipe. The molding or extrusion is covered by a channel member and the entire assembly is secured to the pipe by bands. As previously described for this type of an arrangement, it would be necessary to remove the bands in order to replace the wires or conduit and may be difficult or uneconomical to remove the conduit or wires from the preformed moldings or extrusion in order to effect their repair.

The referenced prior art does not provide a means of securing an elongated heating or cooling means to the outer surface of a pipe in such a manner that the heating or cooling means is uniformly pressed along its length against a flexible surface which in turn presses against and improves the heat transfer contacting relationship between the heating or cooling means and the pipe. Nor does the prior art provide for a means of securing a heating or cooling means against the outer surface of a pipe whereby the heating or cooling means may be easily mounted on or removed from the pipe for replacement or repair without the necessity of having to remove clamps, bands, bonded material, and the like. Nor does the prior art teach or suggest a means by which a heating or cooling means having a variety of cross-sectional shapes can be easily mounted on or removed from the outer surface of a pipe without having to loosen or remove the various clamps, bands, and the like heretofore known in the prior art.

SUMMARY OF THE INVENTION

It is therefore an object of this invention to provide a means for releasably securing an elongate heating or cooling means to the outer surface of a pipe.

It is another object of this invention to provide a means adaptable for releasably securing elongate heating or cooling means having a variety of cross-sectional shapes to the outer surface of a pipe.

It is a further object of this invention to provide a means for uniformly pressing an elongate heating or cooling means, along the length thereof, against the outer surface of a pipe to improve the heat transfer contacting relationship therebetween.

It is still a further object of this invention to provide a means for effectively improving the heat transfer contacting relationship between an elongate heating or cooling means and the outer surface of a pipe in conjunction with providing a means of releasably securing the heating or cooling means to the pipe such that the heating or cooling means can be easily removed for replacement or repair.

It is a feature of this invention to provide a heat transfer apparatus that can be secured to the outer surface of a pipe and that permits an elongate heating or cooling means having a variety of cross-sectional shapes to be secured to or removed from the pipe without having to remove the apparatus from the pipe in conjunction with having a heat conductive base member having sufficient flexibility to conform to the radius of curvature of the pipe outer circumference for improving the heat transfer contacting relationship therebetween and having either one or two resilient side walls that uniformly press the heating or cooling means against the base member along the length thereof to provide a more effective heat transfer contacting between the heating or cooling means and the pipe.

DETAILED DESCRIPTION OF PREFERRED EMBODIMENTS

Figure 1:
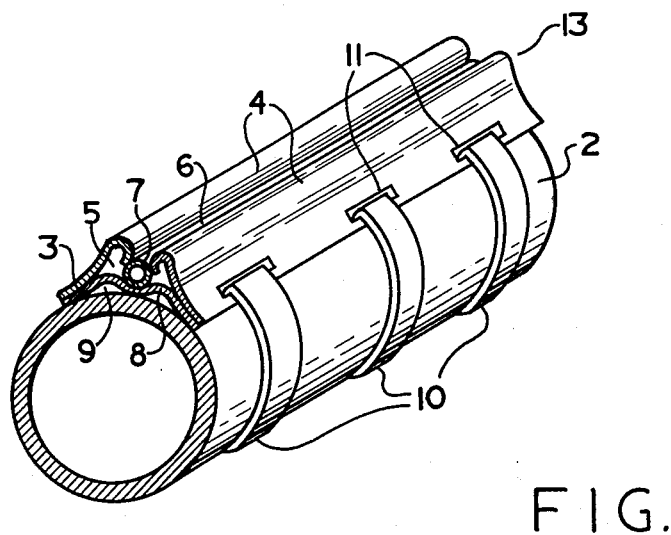
FIG. 1 is a perspective view of an embodiment of the invention secured to the outer surface of a pipe.

FIG. 1 shows an embodiment of heat transfer apparatus 13 of the invention secured to the outer surface of a pipe 2. Apparatus 13 has a base member 3 that extends longitudinally along the length of pipe 2 and is in heat transfer contacting relationship therewith. Base member 3 is adapted to lay along the length of pipe 2 and is sufficiently flexible to adapt to the radius of curvature of the outer circumference of pipe 2. A pair of longitudinally extending side walls 4 extend away from pipe 2 and towards each other over base member 3 to provide a longitudinally extending cavity 5. Side walls 4 end in a spaced-apart relationship over base member 3 to provide a longitudinally extending entrance-way 6 into cavity 5. Elongate heating or cooling means in the form of tube 7 is positioned in a longitudinally extending trough disposed between two spaced-apart longitudinally extending protuberances 8 in the form of arches in the wall of base member 3. Protuberances 8 provide a surface for positioning tube 7 on base member 3 and provide for increased heat transfer contacting relationship between tube 7 and base member 3.

Figure 2:
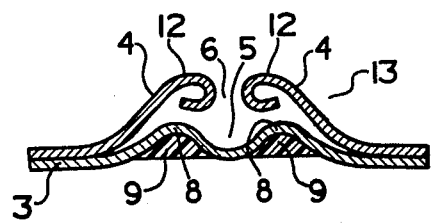
FIG. 2 is an end view of the embodiment of FIG. 1 prior to the securement thereof to the outer surface of a pipe.
Figure 3:
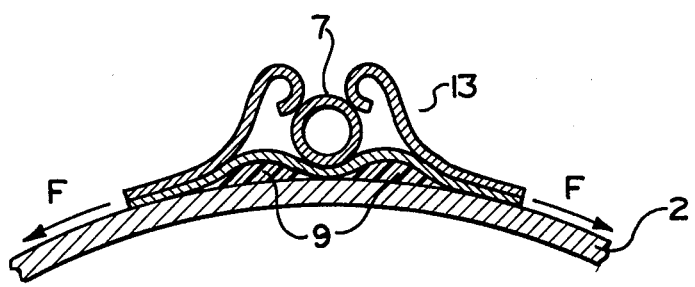
FIG. 3 is an end view of the embodiment of FIG. 1.

As described in further detail with respect to FIGS. 2 and 3, each protuberance 8 in the form of arches in the wall of base member 3 has a radius of curvature on the side of base member 3 that faces towards pipe 2 that has increased as a result of securing apparatus 13 to pipe 2. A deformable heat conductive material 9 is shown in FIG. 1 as a darkened area disposed between arches and the outer surface of the pipe 2 to improve the heat transfer contacting relationship therebetween. Side walls 4 are made from a resilient material which, upon inserting tube 7 through entrance-way 6 into cavity 5, press uniformly against tube 7 and urge tube 7 against base member 3 to provide a more effective heat transfer contacting relationship therebetween. Side walls 4 may be secured to base member 3 by any suitable means.

Apparatus 13 is secured to pipe 2 by means of tightenable straps 10 spaced at intervals along the length of pipe 2. The opposite ends of straps 10 are attached to means 11 disposed on both sides of apparatus 13 along the length thereof for attaching straps 10 thereto. Straps 10 extend around pipe 2 form one side of apparatus 13 to the other side thereof without passing over entrance-way 6 so as not to interfere with the ability to insert tube 7 into or remove tube 7 from cavity 5. The tightening of straps 10 causes base member 3 to press against and conform to the radius of curvature of the outer circumference of pipe 2 and the circumferential and radially inwardly forces produced on apparatus 13 by straps 10 causes the wall of base member 3 in the region of the arches to move radially inwardly towards pipe 2 and press heat conductive material 9 against the outer surface of pipe 2 to increase the heat transfer contracting relationship between tube 7 and pipe 2. Although means 11 is shown in FIG. 1 as openings spaced at intervals along the side of apparatus 13, means 11 may be any suitable means of securing apparatus 13 to pipe 2 provided such means has the ability to firmly secure apparatus 13 to pipe 2 without interferring with entrance-way 6.

The base member of all embodiments of heat transfer apparatus of the invention is made from a heat conductive material having sufficient flexibility in the wall thickness utilized to conform to the radius of curvature of the pipe to which the apparatus is secured in conjunction with having sufficient strength to withstand any circumferential or radial stress placed thereupon as a result of the particular means selected to secure the apparatus to the pipe. The base member may be made, for example, from a metallic material such as carbon steel, stainless steel, or alloys of brass or aluminum. The base member may also be made from non-metallic materials so long as such materials are properly compounded to possess the heat conductive characteristic required as well as the other characteristic hereinbefore described.

The side wall of all embodiments of the invention is required to be resilient in order to press uniformly against the heating or cooling means as hereinbefore described. Embodiments of the invention that feature the side wall as integral with the base member would necessarily be made from material as hereinbefore described for the base member, with the additional requirement that both the side wall and the base member possess resilient characteristics. Although side walls 4 of apparatus 13 are shown in FIG. 1 as having a particular shape for enclosing and pressing against tube 7, it is to be understood that the side wall of all embodiments of the invention may be shaped in any suitable manner in order to adapt to the cross-sectional shape of a particular heating and cooling means desired to be secured to the outer surface of a pipe in accordance with the invention.

The heating or cooling means shown in FIG. 1 in the form of a tube is for illustrative purposes only. The term heating or cooling means as used herein means any elongate heating or cooling means for which the heat transfer apparatus can be adapted to secure said means to the outer surface of a pipe. Since either a heated or a cooled medium can be conveyed through a tube properly selected for a particular application, a tube form is therefore classified as a heating or cooling means. Where an electrical resistance heating wire or cable is employed such as shown, for example, respectively in FIGS. 4 and 6, the heating or cooling means is then classified as a heating means. One familiar in the art of heating or cooling materials conveyed through pipes is in a position to determine for a particular application whether to employ electrical resistance heating wire or cable or to employ tubes through which a heated or cooled medium is conveyed. Generally, such determination would include the size of the pipe, the material to be heated or cooled, the ambient conditions, the use and amount of thermal insulation, and the like.

FIGS. 2 and 3 are shown to illustrate the effect that securing the embodiment of the invention shown in FIG. 1 has on the radius of curvature of an arch in the wall of the base member. Shown in FIG. 2 is an end view of the embodiment of apparatus 13 depicted in FIG. 1 prior to its securement to a pipe and without having a heating or cooling means releasably secured thereto. As hereinbefore described, apparatus 13 has a base member 3 having a pair of side walls 4 extending thereover to provide a cavity 5 having an entrance-way 6. Base member 3 has a pair of protuberances 8 in the form of arches extending into cavity 5 with a deformable heat conducting material 9 disposed in the arches on the side of base member 3 facing the pipe to which apparatus 13 is to be secured. Also shown in FIG. 2 is side wall 4 having an arcuately shaped curve at the end thereof adjacent to entrance-way 6. Although not required, it is preferred that the side walls of apparatus of the invention have such arcuately shaped curves in order to enhance the movement of the heating and cooling means into and out of the cavity and to contribute to the manner in which the side wall presses against the heating or cooling means. The embodiment of apparatus 13 of FIG. 2 is shown secured to the outer surface of pipe 2 in FIG. 3 and has tube 7 contained in the cavity thereof. Although not shown in FIG. 3, the means for securing apparatus 13 to pipe 2 is of a type that exerts a circumferential force on the apparatus. The circumferential force F produced by the securing means increases the radius of curvature on the side of the arches facing pipe 2 and causes the wall of base member 3 in the region of the arches to move radially inwardly towards pipe 2 and press material 9 against the outer surface of pipe 2 to improve the heat transfer contacting relationship between tube 7 and pipe 2.

Figure 4:
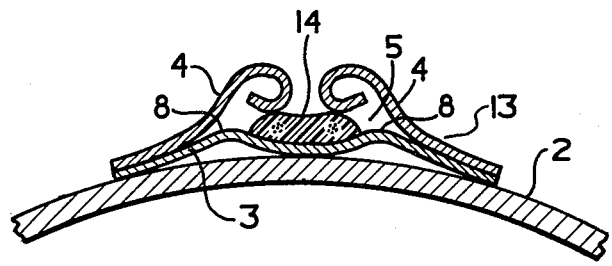
FIGS. 4-11 are end views of other embodiments of the invention secured to the outer surface of a pipe.

FIG. 4 shows an embodiment of apparatus 13 of the invention secured to the outer surface of pipe 2 having an electrical heating resistance cable 14 contained in cavity 5 thereof. The embodiment is shown to illustrate that side walls 4 of apparatus 13 may be shaped so as to press uniformly against a heating means having a variety of cross-sectional shapes such as the oval cross-sectional of cable 14. The protuberances 8 in the form of arches in the wall of base member 3 do not have a deformable heat conductive material contained therein. The embodiment is shown to illustrate that although it is preferred to have such material contained in embodiments of the invention having at least one arch in the base member wall, it is not absolutely required.

Figure 5:
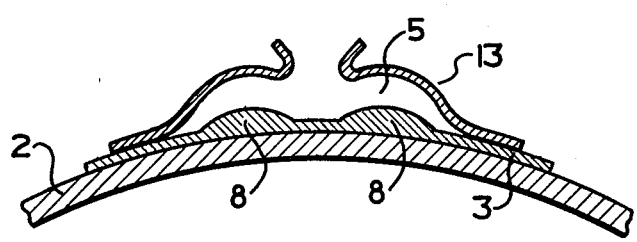

The embodiments of FIG. 5 is included to illustrate that, although it is preferred that the protuberances 8 be in the form of arches on the wall of the base member 3 having the hereinbefore described radius of curvature on the side of the base member that faces towards the pipe, it is not an absolute requirement.

Figure 6:
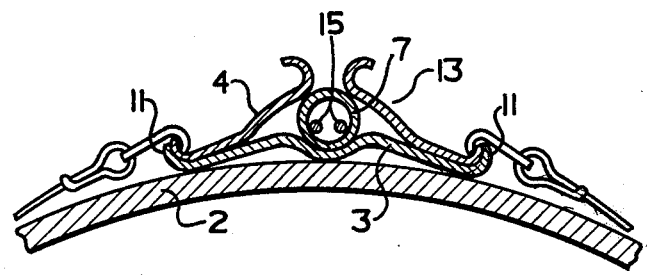

FIG. 6 shows an embodiment of apparatus 13 of the invention secured to pipe 2 wherein base member 3 is integral with side walls 4. The embodiment also illustrates that the longitudinally extending edges of apparatus 13 may be folded upwardly away from the pipe to provide means 11 disposed along the length of the apparatus for securing the apparatus to the pipe. Also shown in FIG. 6, are a pair of electrical resistance heating wires 15 contained in tube 7. Such combination of a tube and one or more electrical resistance heating wires can be used to advantage in providing protection for the wires and increasing the heat transfer contacting area between the wires and the base member.

Figure 7:
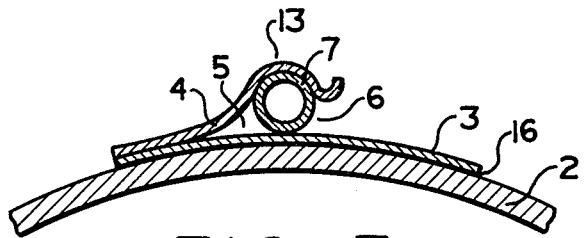

FIG. 7 shows an embodiment of apparatus 13 of the invention secured to the outer surface of pipe 2 and having only one side wall 4 extending away from base member 3 on the side thereof that faces away from pipe 2. Although FIGS. 7 through 11 hereinafter described show embodiments of apparatus of the invention having only one side wall, it is to be understood that the description provided herein pertains equally as well to apparatus of the invention having one or two side walls. Side wall 4 extends over the base member to provide the hereinbefore described longitudinally extending cavity 5 and ends over the base member in a spaced-apart relationship thereto to provide a longitudinally extending entrance-way 6 into cavity 5 between the end of wall 4 and base member 3. Heating or cooling means in the form of tube 7 is contained in cavity 5. Also shown in FIG. 7 is base member 3 without any protuberances such as arches in the wall thereof. The means 11 disposed along the length of apparatus 13 for securing the apparatus to pipe 2 is in the form of an adhesive bondment layer 16 shown as the darkened area between hose member 3 and pipe 2. In cases where apparatus 13 of the invention is adhesively bonded to the outer surface of pipe 2, the adhesive is preferably of a heat conductive type and may be the same as the deformable heat conductive material 9 used in embodiments of the invention having arches in the base member wall. Where appropriate, apparatus made in accordance with the invention may be welded or soldered to the outer surface of the pipe if such is desired.

Figure 8:
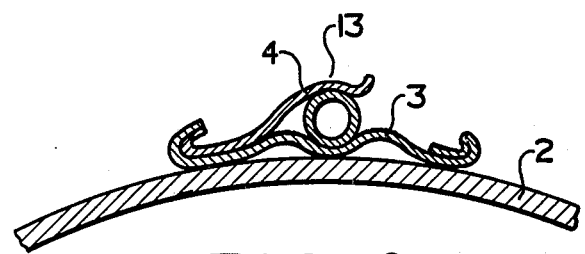
Figure 9:
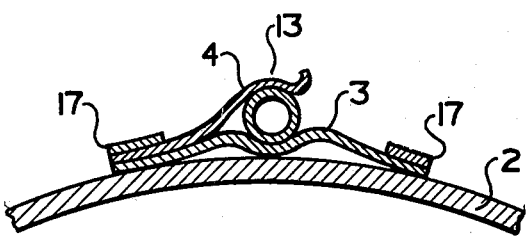
Figure 10:
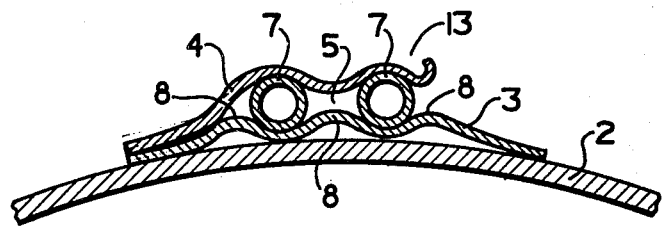
Figure 11:
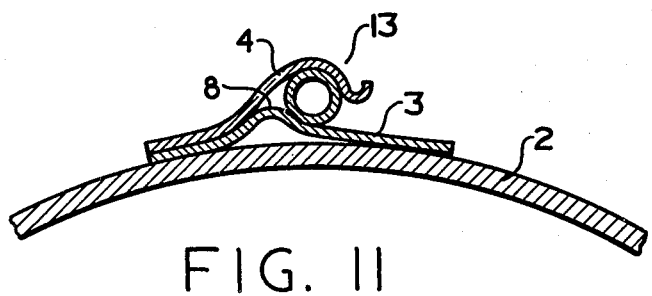

FIGS. 8 through 11 illustrate embodiments of apparatus of the invention secured to the outer surface of pipe 2 and having a single side wall 4. In FIG. 8 single side wall 4 is integral with base member 3. In FIG. 9 single wall 4 and base member 3 have additional plates 17 secured along the outer edges of apparatus 13 on the side thereof that faces away from pipe 2. Plates 17, in conjunction with base member 3 and side wall 4, provide means 11 for securing the apparatus to the pipe. Plates 17 also provide a means of strengthening the longitudinally extending edges of apparatus 13 and may be provided with openings therethrough such as, or example, shown in FIG. 1, for attaching straps 10. In FIG. 10 plurality of elongate heating or cooling means are releasably secured to a pipe. Apparatus 13 secured to the outer surface of pipe 2 has a single side wall 4 extending away from and over base member 3 to provide cavity 5. A pair of heating and cooliong means in the form of tubes 7 are contained in cavity 5 and are positioned in troughs formed as a result of providing protuberances 8 shown in the form of three arches in the wall of base member 3. As evident from FIG. 10, apparatus of the invention having either one or two side walls includes embodiments designed to releasably secure a plurality of elongate heating or cooling means to the outer surface of a pipe as well as have a plurality of protuberances such as arches in the base member thereof. In FIG. 11 apparatus 13 has only one protuberance 8 in the form of an arch in the base member 3 and a single side wall 4 extending away from and over base member 3. The embodiment illustrates that even a single protuberance in the wall of the base member can be used to advantage in increasing the heat transfer contacting surface area between the heating or cooling means and the base member.

Figure 12:
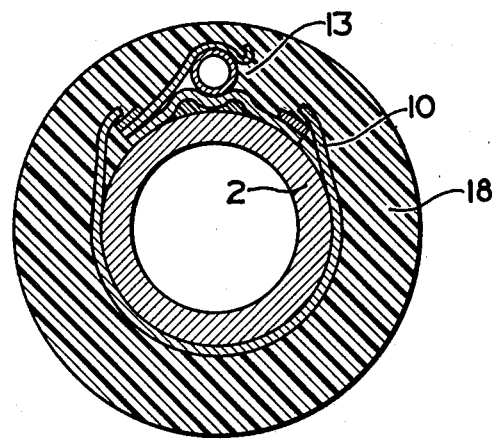
FIG. 12 is a cross-sectional view of an embodiment of the invention secured to the outer surface of a pipe and encompassed by thermal insulation.

Shown in FIG. 12 is the embodiment of FIG. 9 secured to the outer surface of pipe 2 by means of straps 10 and encompassed by a thermal insulation barrier 18. Although not shown in FIG. 12, the thermal barrier may be encompassed by a protective outer jacket. The type and thickness of thermal insulation used is a matter of determination made by those familiar in the art.

Although not shown in the drawings, the side wall 4 may have a thermal insulation disposed on at least one of the surfaces thereof as a means of even further improving thermal efficiency and a thermally insulative material may be disposed between base member 3 and the outer surface of pipe 2 in embodiments of the invention where it is desired to further control the manner in which pipe 2 is heated or cooled by heating or cooling means releasably secured to the pipe by the apparatus of the invention.

What is claimed is:

1. A heat transfer apparatus adapted to lay along the outer surface of a pipe having an outer circumference radius of curvature and to releasably secure an elongate heating or cooling means to the pipe, said apparatus comprising:

an elongate heat conductive base member having a wall having sufficient flexibility to conform to the radius of curvature of the outer circumference of the pipe, a single resilient side wall extending from the side of the base member that faces away from the pipe, said side wall extending over the base member to provide a longitudinally extending cavity therebetween that extends along the entire length of the base member and is suitably sized to contain the heating or cooling means, said side wall ending over the base member in a spaced-apart relationship with the base member to provide a longitudinally extending entrance-way into the cavity along the entire length of the base member that is suitably sized to permit the heating or cooling means to be inserted into and removed from the cavity, and said side wall shaped in such a manner that when the heating or cooling means is inserted through the entrance-way and into the cavity the side wall presses uniformly against the heating or cooling means and urges said means against the base member to provide a more effective heat transfer contacting relationship therebetween, and means disposed along the length of the apparatus for securing the apparatus to the outer surface of the pipe, said securing means adapted to provide a secured heat transfer contacting relationship therebetween and designed so as not to interfere with the entrance-way in order that the heating or cooling means can be inserted into and removed from the cavity without having to release the apparatus from the pipe.

2. The apparatus of claim 1 wherein the means for securing the apparatus to the pipe is provided by a layer of adhesive disposed therebetween.

3. The apparatus of claim 1 wherein the heating means is an electrical resistance heating wire or cable.

4. The apparatus of claim 1 wherein the heating or cooling means is a tube through which either a heated or cooled medium is conveyed.

* * * * *